United States Patent Office 3,489,717
Patented Jan. 13, 1970

3,489,717
FORMALDEHYDE COPOLYMERS CONTAINING NITROGEN
Klaus-Peter Peuchert, Cologne-Buchheim, Ernst-Ulrich Kocher and Kuno Wagner, Leverkusen, and Horst Niermann, Cologne-Stammheim, Germany, assignors to Farbenfabriken Bayer Aktiengesellschaft, Leverkusen, Germany, a German corporation
No Drawing. Filed Nov. 7, 1966, Ser. No. 592,316
Claims priority, application Germany, Dec. 11, 1965,
F 47,897, F 47,898
Int. Cl. C08g *13/00, 9/26*
U.S. Cl. 260—67.5                              3 Claims

ABSTRACT OF THE DISCLOSURE

Terpolymer of trioxane, a cyclic or olefinic monomer and a bifunctional heterocyclic nitrogen containing compound produced by polymerization in the presence of a cationic catalyst and the utility thereof in the production of films and shaped bodies by extrusion and deep drawing moulding techniques.

---

It is known that formaldehyde can be converted by numerous methods into linear polymers of different chain length. Unfortunately, polyoxymethylenes such as these are readily and quantitatively degraded into monomeric formaldehyde by treatment at elevated temperatures.

Trioxane, the cyclic trimer of formaldehyde, can also be polymerised in the presence of cationic catalysts, Lewis acids in particular, to form linear polyoxymethylenes. Unfortunately, these polymers also are thermally unstable. The thermal stability of polyoxymethylene can be increased very considerably by modifying their terminal groups, as H. Staudinger proved in about 1930, by introducing terminal acetyl or methoxy groups. The introduction of terminal alkyl groups yields products which, in addition to increased thermal stability, also show an outstanding resistance to alkalis by virtue of their pure polyacetal structure.

Polyoxymethylenes modified in this way are still not thermally stable enough to satisfy industrial requirements because acids and oxygen degrade the polyoxymethylene chains internally, and this in turn results in complete degradation of the molecules affected. Several ways of counteracting this disadvantage have already been proposed. In one case, the influences of oxygen and acids can be counteracted by the introduction of stabilising additives which inhibit degradation. In addition, copolymers which contain not only (—CH₂—O—)-members but also, to a limited extent, (CH₂—CH₂—O—)-members, are prepared from trioxane and cyclic ethers, acetals and lactones. Chain degradation comes to a standstill at such an oxethylene group. Products such as these are similar in their chemical behaviour to those obtained by the subsequent terminal group alkylation of polyoxymethylenes, i.e. their sensitivity to the effects of oxygen or of oxidation is still high. Accordingly, stabilising additives have to be used in the case of these copolymers also.

Further progress in improving the thermal stability of polyoxymethylenes was made by using cyclic comonomers containing sulphur, although, in this case, the polymerisation velocity of the monomer mixture is reduced so that there are practical limits to the quantities in which these comonomers can be used.

According to one of our earlier proposals, trioxane was polymerised in the presence of cyclic organo-nitrogen compounds of the 1,3-bis-alkyl-(or -aryl)-sulphonyl imidazolidine type as comonomers, in which case the resulting polyoxymethylenes also show an improvement in their thermal stability.

The polyoxymethylenes produced by each of these methods are eminently suitable for use in injection moulding. Owing, however, to the inadequate viscosity of the fluid polyoxymethylene melt, extrusion is only practicable to a limited extent. For example, it is impossible to produce tubing on conventional extruders.

A process for the production of trioxane copolymers has now been found in which trioxane is polymerised in combination with cyclic or olefinic comonomers and bifunctional nitrogen-containing heterocyclic compounds of the formula:

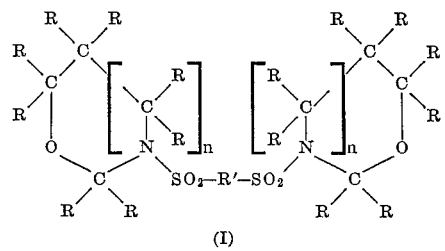

(I)

in the presence of cationic catalysts at temperatures in the range of from —50° C. to 120° C.

The melt indices of the resulting trioxane copolymers are in the range of from approximately 2 to 5, as measured in accordance with ASTM–D 1238–62 T, showing that the melt has a particularly high viscosity. In the general Formula I, R represents hydrogen, a lower alkyl radical ($C_1$–$C_6$) or a lower halogenalkyl radical ($C_1$–$C_6$), whilst R' represents an alkylene chain with up to 20 carbon atoms or a bifunctional aromatic radical and $n$ is the number 1 or 2.

Accordingly, the two ring systems always contain an —N—C—C—C—group and, in addition, a cyclic oxygen atom, in which case the nitrogen atom is attached to the radical R' through a sulphonyl-sulphur atom.

Consequently, the cyclic components can be regarded as 1-oxa-3-azacycloalkanes with 6 and more ring members, and the compounds as such as disulphonamides.

Bifunctional heterocyclic compounds containing nitrogen which are particularly suitable for the process according to the invention include, for example:

1,3-bis-[tetrahydro-1,3-oxazinyl-N-sulphonyl]-propane,
1,4-bis-[tetrahydro-1,3-oxazinyl-N-sulphonyl]-butane,
1,12 - bis - [tetrahydro - 1,3 - oxazinyl - N - sulphonyl]-dodecane,
1,4-bis-[tetrahydro-1,3-oxazinyl-N-sulphonyl]-butane,
1,3-bis-[tetrahydro-1,3-oxazinyl-N-sulphonyl]-benzene,
4,4' - bis-[tetrahydro - 1,3 - oxazinyl-N-sulphonyl]-diphenylether, and 1,4-bis-[hexahydro-1,3-oxazepinyl-N-sulphonyl]-butane.

Cyclic or olefinic comoners in the context of this invention include, for example:

(1) Cyclic ethers corresponding to the general formula:

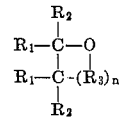

in which $R_1$ and $R_2$ represent hydrogen, lower alkyl radicals and lower halogenalkyl radicals, $R_3$ represents methylene, oxymethylene, alkyl- and halogenoalkyl-substituted methylene, lower alkyl- and halogenalkyl-substituted oxymethylene radicals, and $n$ is a number between 1 and 3, as described in U.S. patent specification No. 3,027,352;

(2) Cyclic thioethers corresponding to the general formula:

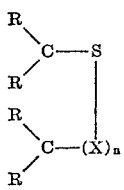

in which R represents a hydrogen atom, a lower alkyl radical or a lower halogenoalkyl radical, X represents a methylene, methylene ether or methylene thioether radical and $n$ is an integer of 0 to 3, in which case the ring system only contains —C—S— or —C—O— bonds in addition to —C—C— bonds, as described in German auslegeschrift No. 1,176,862;

(3) Nitrogen-containing heterocyclic compounds corresponding to the general formula:

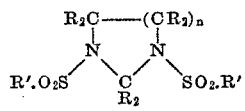

in which R represents hydrogen, a lower alkyl radical or a lower halogenalkyl radical, R' represents an alkyl radical, an aryl radical, an aralkyl radical or an alkaryl radical, in which case the number of C atoms can amount to 20, and $n$ is an integer of from 1 to 3, as described in German patent specification 1,218,154 and in German patent specification application F 42,824;

(4) Silicon-containing comonomers of the kind described in Belgian patent specification No. 679,425;

(5) Nitrogen-containing cyclic comonomers corresponding to the general formula

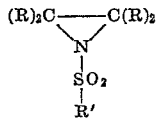

in which R represents hydrogen or a lower alkyl radical, R' represents an alkyl radical, an aryl radical, an aralkyl radical or an alkaryl radical, in which case the number of C atoms can amount to 20, as described in Belgian patent specification No. 666,013, and nitrogen-containing cyclic comonomers corresponding to the general formula:

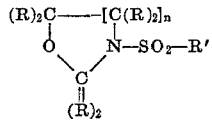

in which R represents hydrogen, a lower alkyl radical or a lower halogenoalkyl radical, R' represents an alkyl radical, an aryl radical, an aralkyl radical or an alkaryl radical, in which case the number of carbon atoms can amount to 20, and $n$ is an integer of from 1 to 3; and (6) Comonomers containing vinyl groups, for example, styrene, vinyl acetate, acrylonitrile, vinylether, derivatives of acrylic acids such as, for example, acrylic amide and methacrylic amide.

It is preferred to use the cyclic, organonitrogen compounds corresponding to the formula:

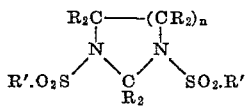

in which R represents hydrogen, a lower alkyl radical or a lower halogenoalkyl radical, R' represents an alkyl radical, an aryl radical, an aralkyl radical or an alkaryl radical, in which case the number of carbon atoms can amount to 20, and $n$ is an integer of from 1 to 3, in particular 1,3 - bis-alkyl-(or-aryl-) sulphonylimidazolidines, in which case the alkyl radicals preferably contain 1 to 6 carbon atoms, and the aryl radical is preferably phenyl.

According to one of our own proposals, for example, the bifunctional comonomers of Formula I can be obtained by reacting 2 mols of alkanolamine of Formula II with 1 mol of the corresponding disulphonic acid chloride of Formula III to form the intermediate compounds (IV), followed by double ring closure with aldehydes or ketones in the presence of an acid as a catalyst, at a temperature in the range of from 0° C. to 130° C., optionally in an inert solvent. In this case, R, R' and $n$ are as defined above.

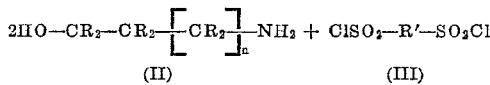

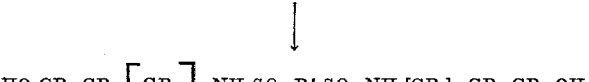

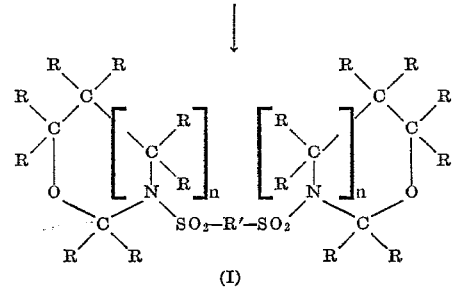

The quantity in which the comonomers are used for the cyclic or olefinic monomers, the cyclic organonitrogen compounds in particular, is preferably between approximately 0.3 and 20 mol percent and, with particular advantage, between 0.5 and 5 mol percent, based on the trioxane used, and between 0.01 and 1 mol percent for the bifunctional compounds in cases in which the polymer is intended to exhibit the properties of polyoxymethylene.

Suitable cationic catalysts for the process according to the invention are, for example:

Concentrated mineral acids such as sulphuric acid, perchloric acid, aliphatic and aromatic sulphonic acids such as methane sulphonic acid, butane sulphonic acid, benzene sulphonic acid, p-toluene sulphonic acid, Lewis acids such as boron trifluoride, boron trichloride, aluminium trichloride, ferric chloride, antimony penta-chloride, titanium tetrachloride and tin tetrachloride or the corresponding fluorides, addition compounds of boron halides with ethers, carboxylic esters, carboxylic acid anhydrides, amines, nitriles and mono- or dicarboxylic acid amides such as, for example, the adducts of boron trifluoride with diethylether, di-n-butyl ether, anisole, acetic ester, acetic anhydride, diphenylamine, acetonitrile, dimethylformamide, glacial acetic acid or water. Halogen-containing organometallic compounds of aluminium such as monoalkylaluminium dichloride may also be used as cationic compounds. Oxonium salts and carboxonium salts such as triethyloxonium fluoborate and 2-methyl dioxolenium fluoborate and fluoborates of aryl diazonium compounds which are converted at elevated temperature into aryl cations, accompanied by the elimination of hydrogen, such as p-nitrophenyl diazonium fluoborate, are also included among the cationic catalysts suitable for the process according to the invention.

The catalysts are added to the polymerization medium in quantities of from 0.001% to 1% by weight, based on the weight of the formaldehyde used.

Polymerisation can be carried out with advantage in a sealed apparatus which enables high pressures of up to approximately 5 atmospheres to be used. In cases in which polymerisation is carried out at a high pressure, a fairly high temperature of up to approximately 150° C. may also be used.

Cpolymerisation may be carried out as block polymerisation, in which case it is complete fairly quickly with an almost quantitative yield. Here, the catalyst is fused with the trioxane and the comonomer and bifunctional component simultaneously added. Alternatively, the trioxane may even be initially fused with the comonomer and the bifunctional component followed by addition of the catalyst, optionally in an inert solvent. It is even possible, however, to carry out polymerisation in suspension in an organic liquid in which trioxane is soluble to a limited extent only. Straight-chain, aliphatic hydrocarbons, for example, with more than 8 carbon atoms or their mixtures such as, for example, a $C_{12}$–$C_{18}$-fraction boiling at a temperature in the range of from 230° C. to 320° C., are suitable for this particular form of polymerisation.

If polymerisation is carried out in solution, suitable organic solvents are, for example, benzene, toluene, hexane, heptane, cyclohexane, iso-octane, white spirit and chlorinated hydrocarbons as well as hydrogenated oligomers (N=2 to 5) of isobutylene and mixtures thereof.

When heated, the copolymers are initially degraded to a certain extent before they reach their maximum stability. This degradation reaction can be accelerated by heating the crude polymer with alkali in an inert solvent, or even in alcohols which form semi-acetals with the degraded formaldehyde. In order to promote this reaction, it is of advantage to add organic or inorganic bases which simultaneously destroy the polymerisation catalyst.

Light stabilisers, dyes, pigments and, optionally, heat and oxidation stabilisers, fillers or processing auxiliaries such as lubricants or mould-release agents and plasticisers, may be added to the polymers.

In addition, the properties of the copolymers may be modified even further by the additional use of further comonomers such as, for example, cationically polymerisable olefins or cyclic organooxygen and/or organosulphur compounds. Examples of such compounds are styrene, acrylonitrile, ethylvinylether, methylvinylsulphone or epoxy compounds such as ethylene oxide or propylene oxide, cyclic acetals such as 1,3-dioxolane or diethylene glycol formal, as well as their thioanalogues such as ethylene sulphide, propylene sulphide, 1,3-oxo-thiolane or thiodiglycol formal.

The copolymers produced in accordane with the invention do not reach their optimal thermal stability until after they have been subjected to brief heat or chemical treatment in the course of which minor unstable components are degraded. This can be done by heating either dry or in suspension, for example in high-boiling hydrocarbons, or even in solution, for example in dimethyl formamide, butyrolactone or dimethyl sulphoxide, to temperatures in the range of from 120° C. to 250° C., preferably in the range of from 170° C. to 230° C. in the presence of tertiary bases.

If is even possible, however, to degrade unstable components by the action of aqueous sodium hydroxide or alcohols containing up to 10 carbon toms such as, for example, cyclohexanol, in the presence of basic compounds. Suitable basic compounds are alkali metal hydroxides and organic bases such as pyridine, tri-n-butylamine and alkanolamines. Degradation to terminal comonomer units may also be carried out during granulation in the extruder, optionlly in the presence of organic or inorganic bases. In this case, light stabilisers, dyes, pigments and, optionally, heat and oxidation stabilisers, processing auxiliaries, fillers or plasticisers may also be added. It is even possible to work at reduced pressure or in an inert gas atmosphere.

By far the most important industrial use of polyoxymethylenes (both the homo- and the co-polymers) has until now been the production of relatively small injection mouldings. The outstanding flow properties and fluidity of the melt which is of great advantage in injection moulding as even relatively complicated moulding tools can be satisfactorily filled in this way, is a disadvantage common to both types of material so far as extrusion is concerned.

For this reason, it has been impossible as yet fully to utilise the familiar, outstanding properties of polyoxymethylenes (for example their high dimensional stability, even at elevated temperatures, and their satisfactory electrical properties, coupled with their remarkable mechanical properties and low water absorption) in a number of interesting fields such as, for example, in the automotive industry or in the electrical industry. The hither-to available materials, even those of relatively high molecular weight, are far from suitable for the production of large-area components, above all by the extrusion and hot-forming techniques, on account of their crystalline structure (approximately 70–75% crystallinity), their accordingly narrow softening range and the fluidity of the melt.

The materials which until now have been recommended for extrusion have a melt index of 2.5–3.0 [g./10 mins.], but are dimensionally unstabe on extrusion. They have a tendency to "flow away" and to shrink or to contract very considerably. Until now, it has only been possible to produce sections, tubing, sheeting and wire insulations on the conventional extruders by applying special techniques and precautionary measures. Films have so far been completely impossible to produce by the blowing process, as has sheeting by the deep-drawing process. In order, for example, to produce hollow articles with a smooth surface, the tools had to be heated to temperatures of around 125° C. This called for heating with circulation thermostats instead of the hitherto conventional water cooling. Accordingly, economic production was not possible. It was frequently impossible, even under these conditions, to obtain smooth surfaces despite the application of a fairly high blowing pressure.

Due to the relatively low viscosity of the plasticised material, the production of uniform wall thicknesses, above all in the manufacture of tubing, had until now involved great difficulty and considerable expense on machinery, such as, for example, long cooling systems and pressure calibration, because even the slightest differences in temperature were sufficient to produce an irregular swelling in the wall of the tube or pipe.

Consequently, satisfactory flow properties of the melt, coupled with an adequate viscosity of the plasticised material, are essential pre-requisites for the economic processing of thermoplasts on conventional machines.

Despite a melt index of between 2.0 and 5.0 g./10 mins., i.e. satisfactory flow properties, the trioxane copolymers according to the invention exhibit a melt viscosity which is such that it is possible for the first time to produce film and sheeting from this material on thermoplast-processing machines without any of the difficulties referred to above. Excessive heating of the moulds is no longer necessary.

The melt indices of the polyoxymethylenes according to the invention are hence equal to, or even higher than, those of the materials so far recommended for extrusion and hot-forming processes. It is surprising that the viscosity of the melt obtained from the new polyoxymethylenes is sufficient, despite an equivalent or even a high melt index, to yield satisfactory moulding by extrusion or hot forming.

The mouldings no longer shrink so drastically, neither are there any irregularities in the surface finish.

It has also not been possible until now to obtain satisfactory rough sheet from formaldehyde polymers on rolls; the material smeared very easily, blocked and could only be removed from the roller with great difficulty. A satisfactory rough sheet can be produced with the materials according to the invention. This is further improved by the inclusion of heat stabilisers (polyamides for example) and admixture with elasticising mixture components.

By virtue of the viscosity of the melt of the products according to the invention, it is now possible to obtain smaller wall thicknesses, even in the production of hollow articles (bottles for example). Sheet material can be satisfactorily processed by all the conventional hot-forming methods.

In the following examples, the intrinsic viscosities $\eta_i$ are measured in a 0.5% solution in p-chlorophenol at 60° C., and the melt indices are determined by the ASTM-D 1238-62 T method.

EXAMPLE 1

320 g. of trioxane, 15 g. of 1,3-bis-methane sulphonyl-imidazolidine, 0.64 g. of 1,4-bis[tetrahydro-1,3-oxazinyl-N-sulphonyl]-butane (0.2% by weight), prepared from 2 mols of 1,3-propanolamine and 1 mol of 1,4-butane disulphonic acid chloride, followed by ring closure with a 40% formalin solution in dilute hydrochloric acid [M.P. 133° C.], and 425 ml. of cyclohexane are introduced into a reaction vessel, 5 ml. of a 2% solution of boron trifluoride dibutyl etherate in cyclohexane being added with stirring at 70° C. After a short time, the polymer was precipitated from the solution in the form of a powder, accompanied by a rise in temperature. The reaction was terminated after 20 minutes and the copolymer was suction-filtered and washed out with methanol. The yield was 275 g. (air-dry). Thermal stability was measured after 10 hours' treatment with 5% sodium hydroxide at 95° C. At 222° C., the loss in weight amounted to 1.6% per hour. The intrinsic viscosity was $\eta_i=1.735$. To determine the melt index, the crude material was directly degraded into a stable material in an extruder following the addition of alkali, stabilisers and lubricants. The melt index was 3.2 [g./10 mins.].

EXAMPLE 2

The procedure was as in Example 1, except that in this case 1% by weight (3.2 g.) of 1,4-bis-[tetrahydro-1,3 - oxazinyl - N - sulphonyl] - butane was used. The crude yield was 270 g. (air-dry). Measurement of thermal stability revealed a weight loss of 1.2% per hour at 222° C. It was impossible to determine an $\eta_i$-value. The melt index was 2.1 [g./10 mins.].

EXAMPLE 3

The procedure was as described in Example 1, except that 1,3 - bis - [tetrahydro - 1,3 - oxazinyl - N - sulphonyl]-propane (similarly prepared: M.P. 93° C.) was used as the bifunctional component in a quantity of 0.32 g. (0.1% by weight). The crude yield of polymer was 260 g. (air-dry), $\eta_i=1.693$. The weight loss was 1.7% per hour at 222° C. and the melt index was 3.8 [g./10 mins.].

EXAMPLE 4

The procedure was as described in Example 1. 1,4-bis- [6 - methyl - tetrahydro - 1,3 - oxazinyl - N - sulphonyl]-butane (similarly prepared: M.P. 102° C.) was used as the bifunctional comonomer in a quantity of 0.64 g. Crude yield=255 g. (air-dry). Measurement of thermal stability revealed a weight loss of 1.3% per hour at 222° C. $\eta_i=1.752$. Melt index=2.5 [g./10 mins.].

EXAMPLE 5

The procedure was as described in Example 1, except that 1,3 - bis - [tetrahydro - 1,3 - oxazinyl - N - sulphonyl]-benzene (similarly synthesised: M.P. 137° C.) was used as the bifunctional comonomer in a quantity of 1.6 g. (0.5% by weight). Air-dry crude yield=248 g. $\eta_i=1.791$ and melt index: 2.2 [g./10 mins.]. Measurement of thermal stability revealed a weight loss of 1.5% per hour at 222° C.

EXAMPLE 6

The procedure was as described in Example 1, except theat 4,4' - bis - [tetrahydro - 1,3 - oxazinyl - N - sulphonyl]-diphenylether (similarly prepared: M.P. 116° C.) was used as the bifunctional component in a quantity of 0.64 g. (0.2% by weight). The crude yield was 250 g. (air-dry), the intrinsic viscosity $\eta_i=1.672$ and the weight loss at 222° C. was 1.8% per hour. Melt index=3.8 [g./10 mins.].

EXAMPLE 7

The polymer of Example 1 which had been drawn beforehand into a uniform rough sheet on rolls at 185° C. to 200° C., and then size-reduced, was blown into a tubular film on a Reifenhause extruder (1:2.4, screw 15D, 45 mm. φ, rotational speed 20 r.p.m., no screen packs) with a temperature gradient increasing towards the nozzle of 170° C.–185° C., through a series-type Reifenhause film-blowing head.

The polymer of Example 1 emerges bubble-free and can be blown without any difficulty into a tube (width or diameter=30 cm.) which can be continuously wound up by way of a suitable take-off attachment.

EXAMPLE 8

The polymer of Example 1 was rolled for 10 minutes at 185° C. to 200° C., resulting in the formation of a satisfactory rough sheet. Pressed squares measuring 200 x 200 x 0.7 mm. were produced in the usual way at 175° C. (5'5').

The pressed squares were pre-heated (5') to approximately 160° C. in a recirculation drying cabinet and then processed in a type 60 Illig deep-draw machine. Form-stepped pyramid. The polymer according to Example 1 is uniformly processable and makes a good copy.

Temperature at the surface of the square-approximately 185° C.

EXAMPLE 9

The polymer of Example 1, which had been drawn beforehand into a uniform rough sheet for approximately 10 minutes at 190° C.–200° C. and then size-reduced, was blown into bottles of 400 cc. capacity on a Fischer blow-forming machine (type JFP 32) with a 15D screw (25–50 r.p.m.). The blowing pressure was approximately 5 to 8 atmospheres, and the total cycle lasted for about 15 to 20" temperature programme of 170° C. to 190° C. increasing towards the nozzle. Despite a wall thickness of only 0.3 to 0.8 mm., the bottles had a satisfactory surface texture or finish.

What is claimed is:

1. A polyoxymethylene moulding composition comprising a copolymer produced by copolymerizing (1) trioxane, (2) 0.3 to 20 mol percent, based on said trioxane, of a monomer of the formula:

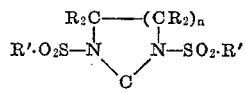

and (3) 0.01 to 1 mol percent, based on said trioxane, of a bifunctional monomer of the formula:

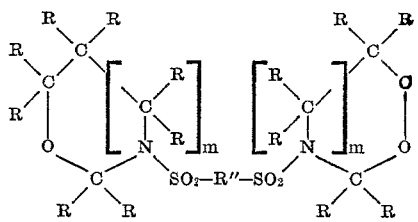

wherein R is hydrogen, lower alkyl or lower haloalkyl; R' is alkyl, aryl, aralkyl or alkaryl containing up to 20 carbon atoms; R" is a methylene chain containing up to 20 carbon atoms, phenylene or a phenylene-oxy-phenylene radical; $n$ is an integer of from 1 to 3 and $m$ is 1 or 2, said copolymerizing being carried out in the presence of a cationically active catalyst at a temperature of between 50 and 120° C.

2. The polyoxymethylene moulding composition of claim 1 wherein (2) is 1,3-bis-methane sulphonylimidazolidine.

3. The polyoxymethylene moulding composition of claim 1, wherein (3) is 1,3-bis-[tetrahydro-1,3-oxazinyl-N-sulphonyl]-propane, 1,4-bis-[tetrahydro-1,3-oxazinyl-N-sulphonyl]-butane, 1,12-bis-[tetrahydro - 1,3 - oxazinyl-N-sulphonyl] - dodecane, 1,4-bis-[6-methyl-tetrahydro - 1,3-oxazinyl-N-sulphonyl]-butane, 1,3-bis-[tetrahydro-1,3-oxazinyl-N-sulphonyl]-benzene, 4,4'-bis-[tetrahydro-1,3-oxazinyl-N-sulphonyl]-diphenylether or 1,4-bis-[hexahydro-1,3-oxazepinyl-N-sulphonyl]-butane.

References Cited

UNITED STATES PATENTS

| | | | |
|---|---|---|---|
| 3,293,219 | 12/1966 | Gottesman et al. | 260—67 |
| 3,317,477 | 5/1967 | Wilson et al. | 260—73 |

FOREIGN PATENTS

| | | |
|---|---|---|
| 6504876 | 10/1965 | Netherlands. |

WILLIAM H. SHORT, Primary Examiner

L. M. PAYNES, Assistant Examiner

U.S. Cl. X.R.

260—45.9, 67, 67.6, 73; 264—209